United States Patent [19]
Savoie et al.

[11] Patent Number: 6,055,799
[45] Date of Patent: May 2, 2000

[54] FORAGE CONDITIONING MACHINE

[75] Inventors: Philipe Savoie, Sainte-Foy; Jacques Lajoie, Saint-Nicolas, both of Canada

[73] Assignee: Universite Laval & Agriculture et Agro-Alimentaire Canada, Sainte-Foy, Canada

[21] Appl. No.: 08/539,303

[22] Filed: Oct. 4, 1995

[51] Int. Cl.[7] .................................................. A01D 61/00
[52] U.S. Cl. .................................. 56/16.4 R; 56/16.4 A; 56/16.5; 56/504; 56/DIG. 23; 56/16.4 B
[58] Field of Search .......................... 56/16.4 R, 16.4 B, 56/16.5, 16.4 A, 504, DIG. 23, 14.1

[56] References Cited

U.S. PATENT DOCUMENTS

| | | | |
|---|---|---|---|
| 3,633,345 | 1/1972 | Scarnato | 56/14.1 |
| 3,712,034 | 1/1973 | Praca | 56/1 |
| 3,732,670 | 5/1973 | Milliken et al. | 56/1 |
| 3,867,808 | 2/1975 | Kidd | 56/14.1 |
| 3,977,165 | 8/1976 | Klinner et al. | 56/16.4 |
| 4,265,076 | 5/1981 | Krutz . | |
| 4,332,125 | 6/1982 | Holdren . | |
| 4,407,111 | 10/1983 | Brune et al. | 56/16.4 R |
| 4,445,313 | 5/1984 | Elliott et al. | 56/16.4 |
| 4,747,260 | 5/1988 | Petrasch et al. | 56/505 |
| 5,036,652 | 8/1991 | Schmittbetz et al. . | |
| 5,152,127 | 10/1992 | Koegel et al. | 56/14.1 |
| 5,269,124 | 12/1993 | Barthel et al. | 56/16.4 |

FOREIGN PATENT DOCUMENTS

| | | | |
|---|---|---|---|
| 4019123 | 12/1991 | Germany | 56/16.4 |
| 4113630 | 10/1992 | Germany | 56/16.4 |
| 4113631 | 10/1992 | Germany | 56/16.4 |
| 1456049 | 2/1987 | U.S.S.R. | 56/16.4 |
| 1681761 | 10/1991 | U.S.S.R. | 56/16.4 |

OTHER PUBLICATIONS

Technical report—Deutz Fahr (4 pages) No Date.
Article—Hay & Forage Grower—Nov. 1991 (2 pages).
Article—PIMA, p. 7, Oct. 1993 (1 page).
Article—Forage Mat Making Research In Québec—Philippe Savoie (2 pages) No Date.
Article—American Society of Agricultural Engineers—vol. 36(2) Mar./Apr. 1993 (7 pages).
Article—Implementing Forage Mat Making on a Pull-type Disk Mower—Dr. P. Savoie (3 pages) No Date.
Rapport Annuel 1990–1991—Développement D'Un Surconditionneur (Macérateur) À Fourrages (63 pages).

*Primary Examiner*—Thomas B. Will
*Assistant Examiner*—Arpad Fabian Kovacs
*Attorney, Agent, or Firm*—Adrian D. Battison; Murray E. Thrift

[57] ABSTRACT

An intense forage conditioning machine includes: a mower, either a cutter bar or disks, perpendicular to the direction of travel for cutting fresh forage off the ground to leave a stubble; a conveying unit to move the cut forage; a macerating unit composed of a series of grooved rolls rotating at different speeds to severely condition the conveyed cut forage; and a double track pressing unit to compress the macerated forage and to deposit the resulting thin mat on the stubble. The macerating unit can be used without the tracks and can comprise only three rollers arranged to form two nips. The rollers can be grooved and can rotate at different speeds.

10 Claims, 3 Drawing Sheets

FORAGE CONDITIONING MACHINE

FIELD OF THE INVENTION

The present invention relates to an intense forage conditioning machine.

BACKGROUND OF THE INVENTION

U.S. Pat. No. 4,265,076 to Krutz describes a machine that macerates forage with two serrated rolls and forms a continuous mat with two compression rolls. The residence time of forage between two rolls during maceration and two other rolls during compression is relatively short, and makes it difficult to obtain very severe conditioning and a uniform mat. Moreover, there is no provision to recuperate juice when it flows out from very wet forage at the compression stage.

U.S. Pat. No. 4,332,125 to Holdren describes a machine that makes discontinuous mats of macerated forage. The main problem with this design is that it accumulates forage on a compression belt until enough material is prepared in a rectangular mat. Under modern operating conditions of high yield and high feed rate, it appears preferable to deposit the macerated forage rapidly and continuously to avoid any plugging.

U.S. Pat. No. 5,036,652 to Schmittbetz and Liebers describes a machine that macerates forage between multiple planetary grooved rolls and compresses the mat between two rolls. The main difference between this machine and the above mentioned Krutz patent is the macerating roll configuration.

Savoie and coworkers (1991, ASAE paper 91-1578, St. Joseph, Mich.; 1993, Transactions of the ASAE 36(2):285–291) describe an experimental unit with a 2.1 m wide cutter bar, eight 1.5 m wide macerating rolls and a 1.2 m wide double-belt press. Maceration was adequate but the machine was bulky and complex. The two rubber belts were subject to high lateral forces under variable yield and moisture and sometimes deposited thick clumps of forage instead of a uniformly thin mat.

Technical report no 13.93 dated June 1993 from Deutz Fahr Company (Kodelstrasse 1, Lauingen, Germany, D89415) describes a 2.8 m wide disk mower, 8-roll maceration system and 8-roll compression unit with additional intermediate components (eight rolls and two belts) to even out material flow. Such a machine is not likely to handle large feed rates which would cause plugging in the intermediate components.

U.S. Pat. No. 5,152,127 to Koegel and co-workers describes a machine that mows and macerates forage by impact. The machine requires upward acceleration of the mowed forage to reach the impact roll. This may limit the use of impact roll maceration to flail mowers.

Commercial literature dated January 1994 from Krone Company (P.O. Box 1163, Spelle, Germany, D-48478) describes a machine with a hammer roll for intensive forage conditioning. However, the hammer roll conditioning machine is a separate unit that picks up an already mowed swath and is therefore not integrated with a mower. The machine does not have any provision for forming compressed mats.

While there have been several attempts to improve forage drying with intensive conditioning, none has successfully handled large feed rates and produced well-formed macerated continuous swaths or mats. It is also important that the intensive conditioning system be integrated in a single machine that includes a mowing mechanism.

STATEMENT OF THE INVENTION

The present invention provides a forage macerating device comprising:

at least three roller means arranged so as to define a first, second and third roller means, means mounting the roller means each for rotation about its own longitudinal axis with the axes parallel and the roller means axially aligned;

said mounting means being arranged such that the first, second and third roller means have the axes thereof located substantially at three apexes of a triangle and so as to define a first nip between the first roller means and the second roller means, and a second nip between the second roller means and the third roller means, each nip arranged to receive the crop material passing therebetween;

at least the second and third roller means comprising a generally cylindrical rigid body having a series of axially extending grooves therealong for engaging and grasping the crop material passing through the nips;

and means for driving the roller means such that the first roller means rotates at a first speed, the second roller means rotates at a second speed greater than the first speed and the third roller means rotates at a third speed greater than the second speed;

the first nip being arranged such that the crop material therein is grasped by the first and second rollers as it passes through the first nip with the second roller moving faster than the first roller;

and the second nip being arranged such that the crop material therein is grasped by the second and third rollers as it passes through the second nip with the third roller moving faster than the second roller.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF THE INVENTION

Figure 4:
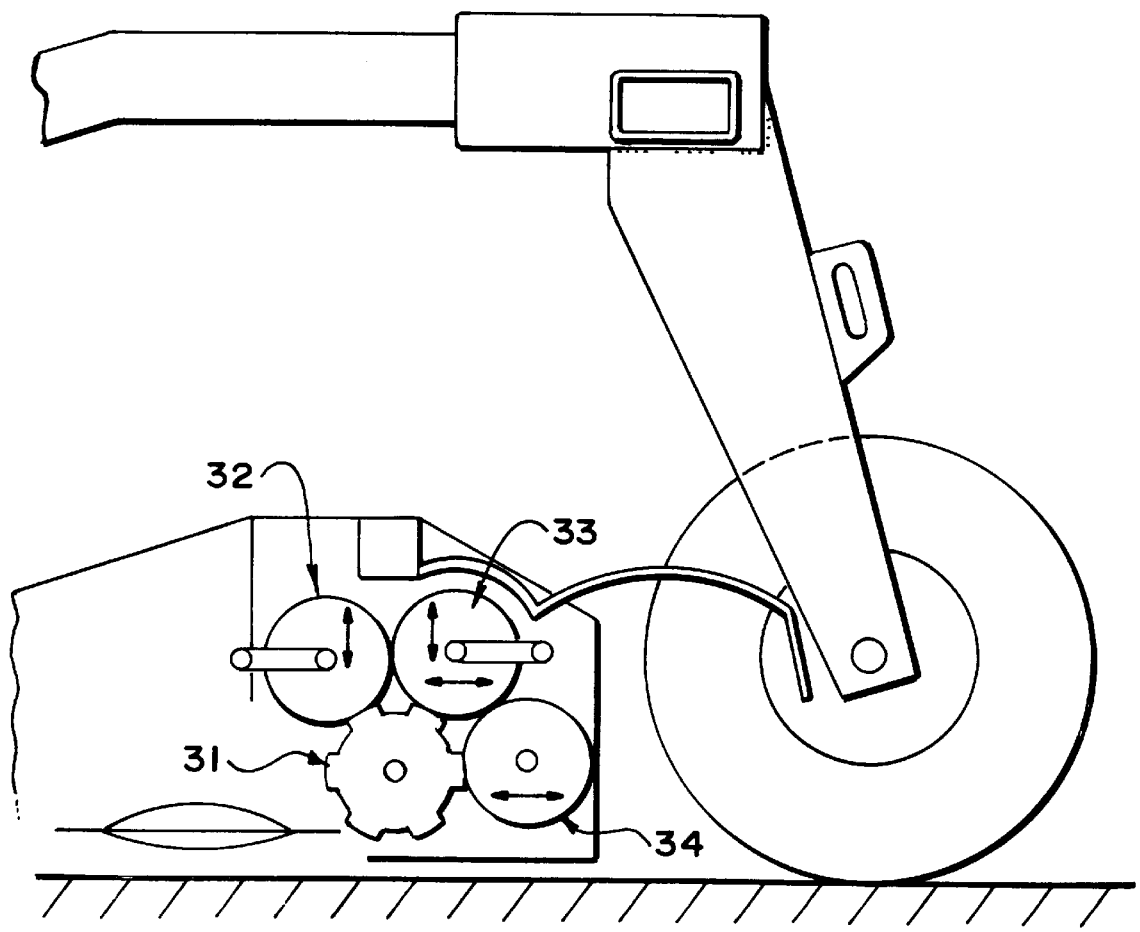
FIG. 4 illustrates a second simplified configuration of a pull-type disk mower-superconditioner including the macerator of the present invention.

In FIG. 4, intensive conditioning as described hereinafter is applied to a pull-type disk mower by using a single feeding roll 31 and three macerating rolls 32, 33 and 34. A compression system would be optional (and is not included in the drawing). The heavily ribbed feeding roll 31 at the bottom is used to pull the freshly mowed forage upwards and to feed it through the macerating rolls. When the mower-macerator is used without a compression system, the macerated forage is ejected against a curved plate 35 and drops onto the stubble as a fluffy swath.

Figure 1:
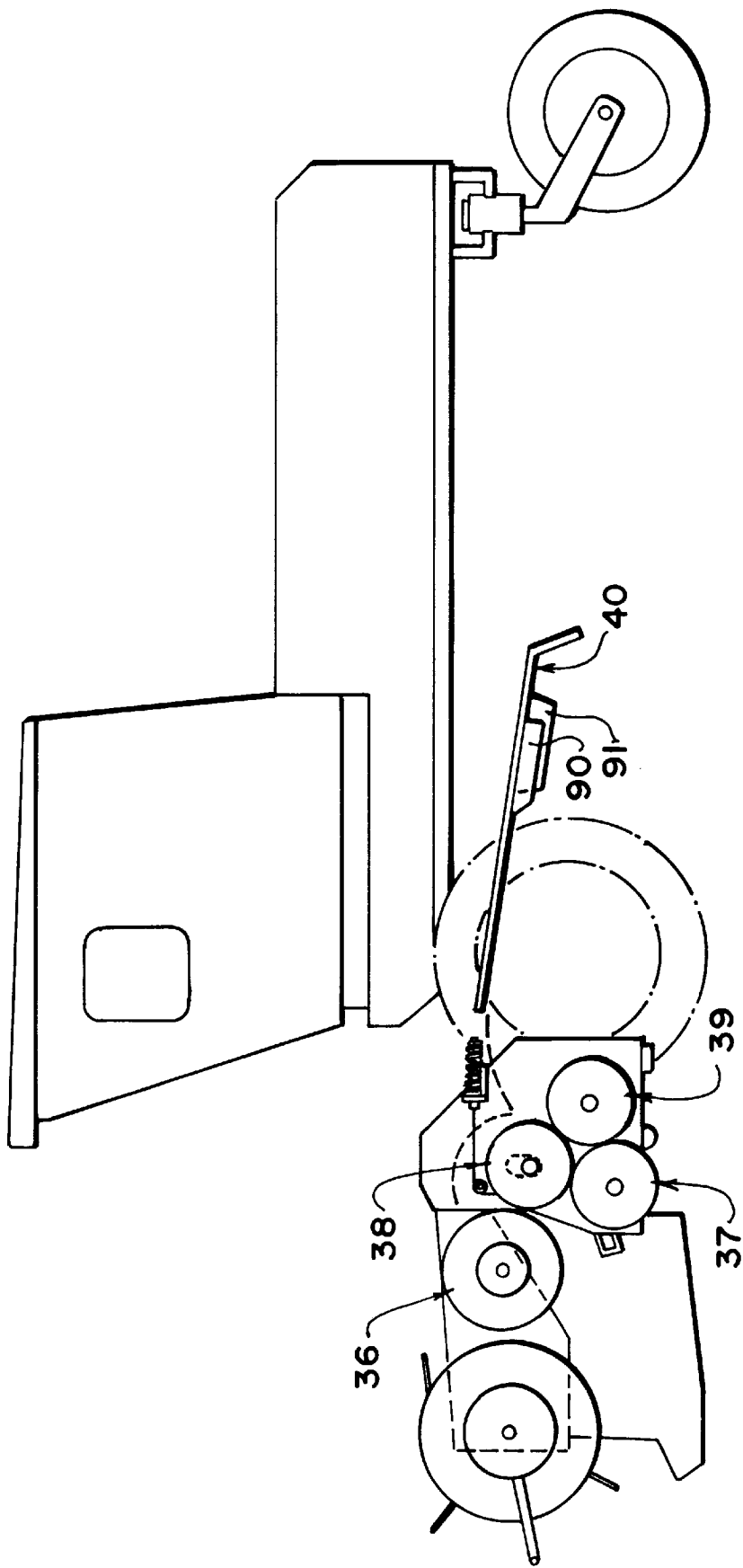
FIG. 1 illustrates a first simplified configuration of a self-propelled mower-superconditioner including the macerator of the present invention.

In FIG. 1, a first simplified configuration the macerator of the present invention is adapted to a cutter bar self-propelled mower. The freshly mowed forage is fed by the conveying auger 36 directly to a set of three macerating rolls 37, 38 and 39. The nip point of the first two macerating rolls 37 and 38 is located at a position below the axial center of the auger so the mowed material flows easily downward and backward by gravity. A short flat horizontal plate may be useful between the auger and the first bottom macerating roll 37 to ensure proper feeding. The macerated forage is ejected at the back of the machine against a plate 40 that deflects and deposits a fluffy swath on the stubble.

Figure 2:
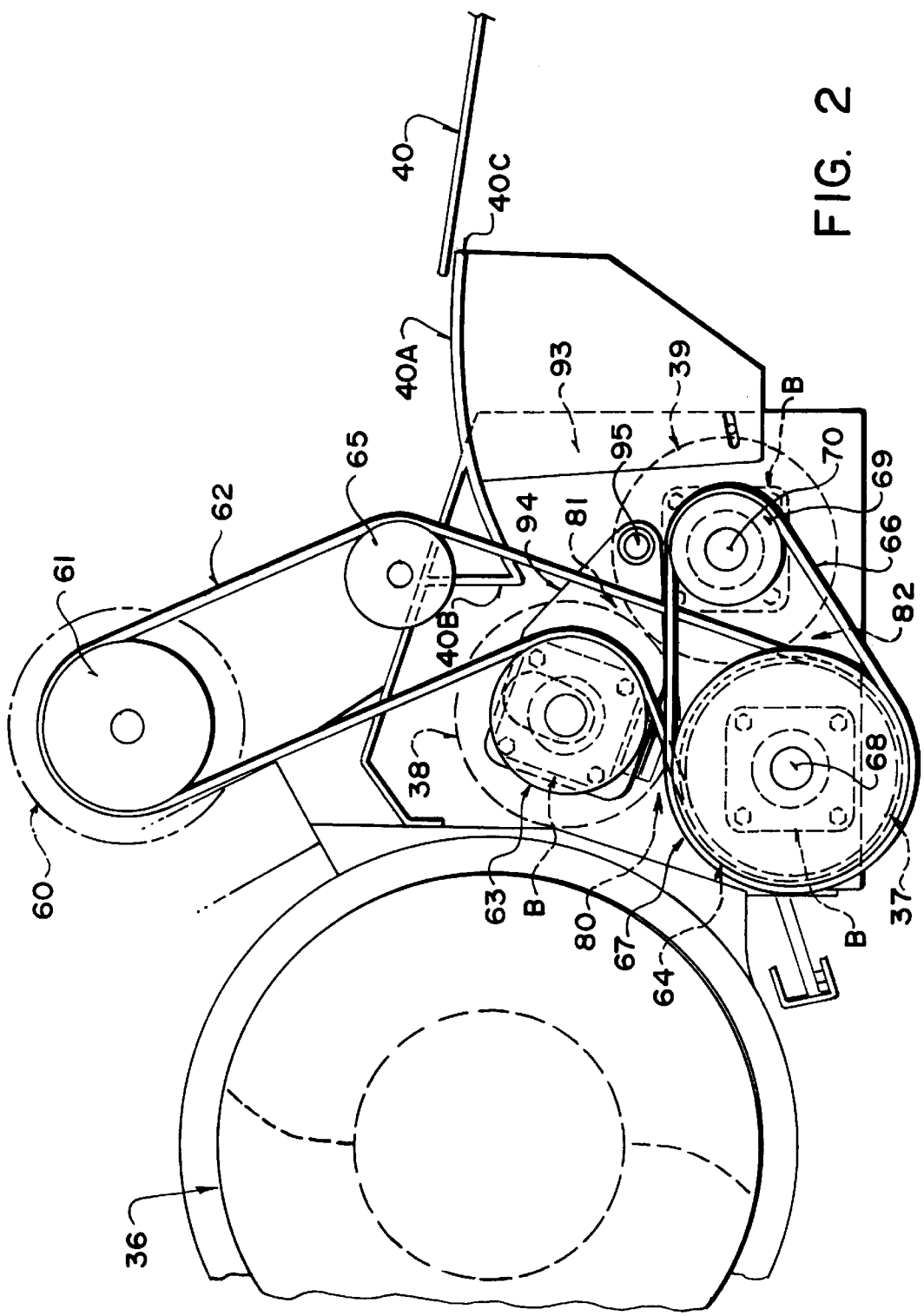
FIG. 2 is a side elevational view of the configuration of FIG. 1 on an enlarged scale showing the drive arrangement which obtains the differential speeds of the rollers.

In FIG. 2 is shown more detail of the drive system to the rollers 37, 38 and 39. More specifically the drive system includes a motor 60 which provides drive to a pulley 61 driving a belt 62. The belt 62 passes around a pulley 63 on the roller 38 and a second pulley 64 on the roller 37. The belt further passes around an idler 65. The pulley 64 is of larger diameter than the pulley 63 so that the roller 38 is driven at a speed or angular velocity greater than that of the roller 37.

Drive to the roller 39 is effected by a second belt 66 which engages around a larger pulley 67 which is mounted on a shaft 68 of the roller 37 outside or beyond the pulley 64 and has a diameter larger than that of the pulley 64. The belt 66 extends from the pulley 67 to a pulley 69 mounted on a shaft 70 of the roller 39 and axially aligned with the pulley 67. The diameter of the pulley 69 is less than that of the pulley 67 so that the roller 39 is driven at a higher speed than the roller 37 and, due to the difference in diameters of the drive pulleys, greater than the roller 38. This difference in roller speed provides a stretching effect on the forage as it passes from the first nip point to the second nip point.

The roller 38 is mounted on a shaft 71 and the shafts 68, 70 and 71 of the rollers are arranged at the apexes of a triangle. In the embodiment shown the rollers have the same diameter so that the triangle has equal sides and the spacing between each roller and the next is identical.

Thus the roller 37 forms a first roller of the system which is driven at a first slowest speed which can preferably be of the order of 1000 RPM. The roller 38 comprises a second roller of the system which is driven at a faster speed than the first roller with a roll speed ratio (38 over 37) in the range 1.1 to 2.5. In one example the roller 38 can therefore be driven at a rate of the order of 1350 RPM which gives a ratio of 1.35. The roller 39 forms a third roller of the system and is driven at a rate faster than roller 37 and at a roller speed different from roller 38. In one example the roller 39 can be driven at a rate of the order of 1850 RPM which is greater than the rate of roller 38 by a ratio of approximately 1.35. Thus the speeds of the rollers are arranged so that the speed increases from the first to the second and the speed of the third roller is different from that of the second roller, that is, it is either greater or less than that of the second roller provided the speed of the third roller is greater than that of the first roller to maintain a stretching effect on the forage from the first nip point to the second nip point.

Each of the rollers has a surface which has longitudinal grooves forming a knurled surface, portions of which are shown in FIG. 13. Thus it will be noted that the grooves are generally V-shaped forming an apex between the grooves. Each groove is generally indicated at 75 with the apexes indicated at 76. For convenience of manufacture and to avoid changes during wear, the apexes are not sharp but instead have a width of the order of 0.03 inches (0.8 mm). Also the rollers are supported so that in a position of closest approach the rollers do not touch and the grooves do not intermesh but instead there is a spacing between the apexes 76 of the order of 0.04 inches (1 mm). This arrangement of the grooves and the spacing allows the rollers to run at the differential speeds necessary without excessive wear of the surfaces of the rollers.

The roller system thus forms two operating nips indicated at 80 and 81 respectively between the first and second rollers and between the second and third rollers. There is a similar point of closest approach 82 between the first and third rollers but this does not act as a nip on the material since the material passes through the nips 80 and 81 and is prevented or inhibited from passing between the first and third rollers due to the fact that the roller 39 is rotating in a direction to carry the material upward to the nip 81 and is rotating at a speed greater than the roller 37 so that the tendency of the material is to pass from the nip 80 to the nip 81.

Figure 3:
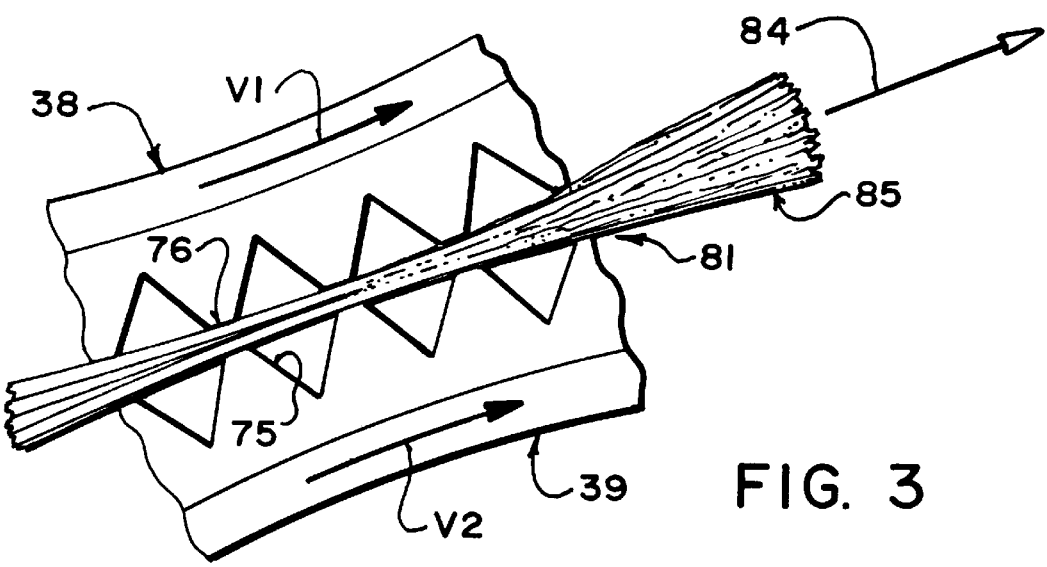
FIG. 3 is a cross-sectional view through two of the rollers of FIG. 2 at the nip therebetween showing the cooperation with the crop material.

It will be noted that the first roller is positioned furthest to the left so that the second roller is upward and slightly rearward of the first roller. The third roller is downward and rearward of the second roller. In this way the nips form a direction of feed which is tangential to the rollers at the nip in which the first nip 80 has a direction of feed which is slightly downward and rearward and the second nip 81 has a direction of feed indicated at 84 in FIG. 3 which is upward and rearward.

The maceration on the crop material indicated at 85 in the second nip 81 is effected by the grasping action of the rollers on the material generated by the apexes 76 and by the fact that the velocity V1 of the second roller 38 is different from the velocity V2 of the third roller 39 and the velocity of the third roller is greater than that of the first roller. This tends to split and break the crop stems by a stretching action to provide the required maceration effect as previously described.

In addition the arrangement shown in FIGS. 1 and 2 using only three rollers generates a further conditioning effect besides the maceration effect on the crop in that each stem of the crop is engaged between both of the nips 80 and 81 while the third roller has an increase velocity relative to the first roller. In this way the increased velocity of the third roller tends to slightly stretch or tear the crop material from the roller 37 as the crop material is carried from the nip 80 to the nip 81.

As the feed direction of the nip 81 is upward and rearward, there is provided an initial portion 40A of the guide plate 40 which is located at the rear of the roller 38. Thus a front apex 40B of the guide surface is located closely adjacent the surface of the roller 38 and above the nip 81. From that position the surface 40A is curved rearwardly to a rear edge 40C in front of the plate 40 which is suspended from the frame of the tractor as shown in FIG. 1.

On the plate 40 is provided a plurality of fins 90, 91 which are arranged at transversely spaced positions across the width of the guide plate 40 and are angled relative to the longitudinal direction of the guide plate 40 so as to redirect the crop material as it moves longitudinally along the guide plate 40 so as to increase or decrease the width of the swath formed, in accordance with requirements.

The shafts 68, 70 and 71 are mounted in bearings carried in end plates 93, one of which is shown in FIG. 2. The bearings are indicated at B. The bearing of the roller 38 is mounted in a pivot plate 94 carried on a pivot pin 95 so as to allow the necessary upward movement of the roller 38 as previously described. The pivot pin is located so as to allow sufficient upward and downward movement without affecting the tension in the drive belt 62.

In an alternative arrangement (not shown), the maceration assembly can be mounted in an open type swather header in which the crop material is deposited from the ends of drapers onto the ground between the drapers on the header. The macerator assembly is then mounted rearwardly of the header with the first roller 37 at or closely adjacent the ground so as to pick up the crop material as it is deposited onto the ground from the opening between the drapers. If required, the front roller 37 can be of a type which has brushes, flaps or ribs on the outside surface to assist in picking up the crop material. Such brushes, flaps or ribs are arranged longitudinally of the surface parallel to the axis so that the spacing of the surface of the roller is increased relative to the second and third rollers. However the maceration action can occur between the nip of the first roller and the second roller due to the increased velocity of the second roller relative to the first roller.

Table 1 shows average field drying values of second cutting alfalfa with the large scale prototype compared to a commercial disk mower-conditioner with steel finger flail conditioning (called hereafter conventional conditioning). The initial moisture at mowing averaged 83%, the dry matter yield averaged 1.1 ton per acre (2.4 ton per hectare) and mowing was assumed to occur at 9 a.m.. By the end of the first day of drying (8 p.m.), the macerated forage was ready to harvest as wilted silage (49 to 59% moisture) whereas the conventionally conditioned forage was too wet (66% moisture) to put in a tower silo. By 4 p.m. on the second day, the macerated-deposited forage was practically ready to harvest as baled hay if barn ventilation or a moist hay preservative was used. Hay harvest would be at least one day sooner with mowing-maceration compared to conventional mowing-conditioning.

TABLE 1

Observed field drying with an intensive forage conditioning prototype compared to a conventional mower-conditioner. Values are averaged over four mowing dates.

| | | Moisture Content (% wet basis) | | | |
|---|---|---|---|---|---|
| Day | Time | Conventional conditioning | Macerated-ejected | Macerated-compressed-deposited | Macerated-deposited |
| 1 | 9 a.m. | 83.0 | 83.0 | 83.0 | 83.0 |
| 1 | 8 p.m. | 66.2 | 58.7 | 52.1 | 48.5 |
| 2 | 4 p.m. | 57.9 | 44.8 | 35.6 | 29.0 |

Conventional conditioning would not allow harvesting before the third day of drying with the risk of rain, microbial deterioration of the forage and the need to further manipulate the windrow to reach appropriate moisture.

Macerated forage also has a potentially higher feed value than conventionally conditioned forage. An original feeding trial was completed with macerated alfalfa hay and unmacerated alfalfa hay (conventionally conditioned with rubber rolls). Macerated hay was harvested with an experimental field machine of eight macerating rolls turning at a relatively low speed (670 and 1000 rpm for low-speed and high speed rolls respectively) without a compression unit. Twenty-four Holstein cows of second or greater parity were randomly assigned to receive one of two treatments: (1) a ration based on alfalfa hay harvested and baled traditionally (small rectangular bales) or (2) a ration based on superconditioned alfalfa hay baled traditionally. All cows received 10 kg per day of an 18% crude protein commercially produced concentrate and their respective hay ad libitum (without limitation on quantity) beginning their fourth week postpartum (after calving) until week 14 postpartum (10 weeks of early lactation). Cows fed conventional hay ate 14.03 kg/d and cows fed superconditioned hay ate 16.11 kg/d (a 15% increase). Cows on the superconditioned hay ration produced 15% more milk (34.32 kg/d vs 29.93 kg/d). Milk fat content was the same for both milks (3.39%) but milk protein was higher from cows eating superconditioned hay (3.27% vs 3.11%).

Although the invention has been described above in relation to some specific forms, it will be evident to a person skilled in the art that it may be modified and refined in various ways. It is therefore wished to have it understood that the present invention should not be limited in scope, except by the terms of the following claims.

We claim:

1. A forage macerating device comprising:
   at least three roller means arranged so as to define a first, second and third roller means, means mounting the roller means each for rotation about its own longitudinal axis with the axes parallel and the roller means axially aligned;
   said mounting means being arranged such that the first, second and third roller means have the axes thereof located substantially at three apexes of a triangle and so as to define a first nip between the first roller means and the second roller means, and a second nip between the second roller means and the third roller means, each nip arranged to receive the crop material passing therebetween;
   at least the second and third roller means comprising a generally cylindrical rigid body having a series of axially extending grooves therealong for engaging and grasping the crop material passing through the nips;
   and means for driving the roller means such that the first roller means rotates at a first speed, the second roller means rotates at a second speed greater than the first speed and the third roller means rotates at a third speed greater than the second speed;
   the first nip being arranged such that the crop material therein is grasped by the first and second rollers as it passes through the first nip with the second roller moving faster than the first roller;
   and the second nip being arranged such that the crop material therein is grasped by the second and third rollers as it passes through the second nip with the third roller moving faster than the second roller.

2. The machine according to claim 1 wherein the macerating assembly includes only three roller means.

3. The machine according to claim 2 wherein the second roller means is located upwardly of and rearwardly of the first roller means such that the first nip defines a feed direction which is inclined rearwardly and downwardly and such that the second nip defines a feed direction which is inclined rearwardly and upwardly.

4. The machine according to claim 1 wherein each of the roller means of the macerating assembly has grooves therein.

5. The machine according to claim 1 wherein the grooves of the roller means are triangular in cross-section converging to an apex at an outermost edge thereof.

6. The machine according to claim 1 wherein the roller means are spaced such that the grooves do not intermesh at the nips.

7. The machine according to claim 1 wherein at least the second and third roller means of the macerating assembly are driven at a speed greater than 1000 rpm.

8. The machine according to claim 1 wherein the first and third roller means are arranged at a spacing approximately equal to the spacing of the first and second nips so that the greater speed of rotation of the third roller means prevents crop material from passing between the first and third roller means.

9. A forage macerating device comprising:

at least three roller means arranged so as to define a first, second and third roller means, means mounting the roller means each for rotation about its own longitudinal axis with the axes parallel and the roller means axially aligned;

said mounting means being arranged such that the first, second and third roller means have the axes thereof located substantially at three apexes of a triangle and so as to define a first nip between the first roller means and the second roller means, and a second nip between the second roller means and the third roller means, each nip arranged to receive the crop material passing therebetween;

at least the second and third roller means comprising a generally cylindrical rigid body having a series of axially extending grooves therealong for engaging and grasping the crop material passing through the nips;

and means for driving the roller means such that the first roller means rotates at a first speed, the second roller means rotates at a second speed greater than the first speed and the third roller means rotates at a third speed greater than the second speed;

the first nip being arranged such that the crop material therein is grasped by the first and second rollers as it passes through the first nip with the second roller moving faster than the first roller;

and the second nip being arranged such that the crop material therein is grasped by the second and third rollers as it passes through the second nip with the third roller moving faster than the second roller;

wherein the second roller means is located upwardly of and rearwardly of the first roller means such that the first nip defines a feed direction which is inclined rearwardly and downwardly and such that the second nip defines a feed direction which is inclined rearwardly and upwardly;

and a guide surface mounted on the machine frame rearwardly and upwardly of the maceration assembly for receiving crop from the second nip thereof and for guiding the crop rearwardly and downwardly to the around to form a swath thereon.

10. The machine according to claim 9 wherein the guide surface includes a plurality of downwardly extending fins for guiding the crop material as the crop material moves rearwardly, the fins being arranged at an angle to the longitudinal direction to move the crop material transversely to form the swath.

* * * * *